United States Patent [19]

Walthall

[11] Patent Number: 5,353,303

[45] Date of Patent: Oct. 4, 1994

[54] TECHNIQUE FOR INCREASING THE DATA RATE IN A SPREAD SPECTRUM DATA LINK

[75] Inventor: David E. Walthall, Crestview, Fla.

[73] Assignee: The United States of America as represented by the Secretary of the Air Force, Wright-Patterson Air Force Base, Ohio

[21] Appl. No.: 134,011

[22] Filed: Oct. 4, 1993

[51] Int. Cl.$^5$ .................. H04L 27/30; H03C 7/00
[52] U.S. Cl. .......................... 375/1; 380/34; 375/23; 375/68; 332/112; 370/10
[58] Field of Search ............... 375/1, 23, 68; 380/34, 380/46; 370/8, 10, 18, 19; 332/112

[56] References Cited

U.S. PATENT DOCUMENTS

| | | | |
|---|---|---|---|
| 3,831,096 | 8/1974 | Brown, Jr. .................. | 375/81 |
| 3,875,332 | 4/1975 | Fletcher et al. ............ | 370/31 |
| 4,743,906 | 5/1988 | Fullerton .................... | 342/27 |
| 4,972,506 | 11/1990 | Uddenfeldt ................. | 455/33.1 |
| 4,982,282 | 1/1991 | Saito et al. ................. | 358/133 |
| 5,029,185 | 7/1991 | Wei ............................ | 375/27 |
| 5,030,954 | 7/1991 | Ribner ....................... | 341/172 |
| 5,042,037 | 8/1991 | Endoh ........................ | 371/57.1 |
| 5,113,278 | 5/1992 | Degura et al. .............. | 375/1 X |
| 5,157,686 | 10/1992 | Omura et al. ............... | 375/1 |
| 5,159,611 | 10/1992 | Tomita et al. .............. | 375/34 |
| 5,166,952 | 11/1992 | Omurg et al. ............... | 375/1 |
| 5,253,268 | 10/1993 | Omura et al. ............... | 375/1 |

OTHER PUBLICATIONS

Walthall, David, International Foundation For Telemetering, Oct. 1992, pp. 389-396; "Intl. Telemetering Conference" Proceedings.

Data Link Message Format Specification (DFCS), Feb. 17, 1976, pp. 1-62, IBM #75-L36-032.

*Primary Examiner*—Bernarr E. Gregory
*Attorney, Agent, or Firm*—Bernard E. Franz; Thomas L. Kundert

[57] ABSTRACT

A method for increasing the bit rate of a data link is to select two additional 31-bit chip code patterns that are orthogonal to the present two chip codes, and to each other. This method will not require any more bandwidth that the present 10 MHz used. This method suggests that each of the four chip code patterns are assigned a two bit value i.e.: 00, 01, 10, 11. At present, the two correlated chip codes represent data in a pulse position method. No information is transferred by determining which of the two chip codes actually correlated. This new method suggests each of the four chip code patterns will still perform the pulse position modulation and also provide two additional bits of data. These additional two bits of data will up the data rate of the link by 100 percent. Alternatively, the data rate may be increased by coding the datasuch that a reduction in duty cycle is realized as well as an increase in the data rate. Variations of the coding scheme avoid repeating a chip code in successive windows to reduce the effects of multipath propagation.

5 Claims, 6 Drawing Sheets

TECHNIQUE FOR INCREASING THE DATA RATE IN A SPREAD SPECTRUM DATA LINK

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a technique for increasing the data rate without increasing the bandwidth requirement in a spread spectrum data link.

More particularly, the invention relates to an improvement (Next Generation Target Control System (NGTCS)) in tracking/ control systems for target aircraft, i.e. Drone Formation Control System (DFCS), Gulf Range Drone Control Upgrade System (GRDCUS), and Multiple Tracking and Control System (MTACS).

The NGTCS has a goal to remotely control 18 aircraft, with a growth potential of 24, by using a single data link frequency. These aircraft can be located over the horizon from the control facility, thus requiring a relay to retransmit the command messages. At present, the DFCS, GRDCUS, and MTACS data link waveform (hereinafter referred to as the "DFCS" waveform) can marginally support the 18 aircraft, over the horizon, scenario. In an effort to plan for growth potential, the basic data link waveform of these data links needs to be improved upon.

The following U.S. Pat. Nos. are of interest.
5,159,611—Tomita et al
5,042,037—Endoh
5,030,954—Ribnor
5,029,185—Wei
4,982,282—Saito et al
4,972,506—Uddenfeldt
3,875,332—Fletcher et al
3,831,096—Brown, Jr.

The Tomita et al patent discloses a variable rate coder for transforming an input signal into a low bit rate digital signal. While this reference teaches the use of coding mean, such use is directed toward the achieving of a low bit rate in contrast to the objective of the present invention, i.e., increased data rate (each data pulse equals two bits of information. Endoh is directed to a digital data modulation circuit having a DC component suppression function. Endoh is similar to Tomira et al in his teaching that an object of his invention is to provide a circuit which operates in a manner that minimizes an increase in bit rate. Ribnor is concerned with improving resolution by doubling the oversampling ratio (ratio of initial to final conversion rates) without increasing the circuit speed requirements. While Ribnor teaches that resolution improves by 2.5 bits for each doubling of the oversampling ratio and increases 3.5 bits for a third-order modulator, there is no teaching of increasing data rate by coding the data in a manner that bandwidth requirement is not increased or that duty cycle is reduced. Wei is concerned with the use of coded modulation techniques in fading channel applications and notes the applicability of trellis-coded modulation thereto. While Wei points up the advantages of a "coded" modulation approach and the ultimate result of enhanced capability without requiring additional signal bandwidth, he does not address the selection of "another set of orthogonal chip codes" or the manner of coding such that the duty cycle is reduced. Saito et al, like Wei, is deficient in any teaching of the subject invention's selection or manner of coding, but is primarily concerned with an image signal compression encoding apparatus in which digital image data for a screen is subdivided into a plurality of blocks for the purpose of achieving a two-dimensional orthogonal transformation encoding on image data of each block. Uddenfeldt is directed to the solution of a problem with time-division multiple access (TDMA) type mobile radio systems. The solution, unlike the teaching of the subject invention, involves reducing the bit frequency of the data information flow. Fullerton is concerned with a time domain radio transmission system. Fullerton's invention clearly is directed to target identification (see col 2, lines 55–64). However, there is no teaching of coding in any particular manner to obtain increased data rate. The Fletcher reference concerns coded data rates of 1.0 mega bits per second but is limited to transmission lines that provide either dedicated or party line communications. Brown, Jr. clearly is concerned with tracking but is deficient in any teaching of increasing data rate by specific steps of the subject invention.

SUMMARY OF THE INVENTION

An objective of the invention is to provide for new tracking/ control system requirements which demand that the present DFCS/ GRDCUS/MTACS data link bit rate be increased.

The present invention achieves a growth potential with respect to the number of aircraft that can be supported by increasing the data link's data rate without increasing the bandwidth. The increase is accomplished by selecting another set of orthogonal chip codes and allowing them to contain information themselves. Alternatively, the data rate may be increased by coding the data such that a reduction in duty cycle is realized as well as an increase in the data rate.

The invention relates to a technique for achieving this increase by selecting two additional 31-bit chip code patterns that are orthogonal to the present chip codes, and to each other. This method will not require any more bandwidth that the present 10 MHz used. This method suggests that each of the four chip code patterns are assigned a two bit value i.e.: 00, 01, 10, 11. At present, the two correlated chip codes represent data in a pulse position method. No information is transferred by determining which of the two chip codes actually correlated. This new method suggests each of the four chip code patterns will still perform the pulse position modulation and also provide two additional bits of data. These additional two bits of data will up the data rate of the link by 100 percent.

DETAILED DESCRIPTION

Introduction

The Next Generation Target Control System (NGTCS) has a goal to remotely control 18 aircraft, with a growth potential of 24, by using a single data link frequency. These aircraft can be located over the horizon from the control facility, thus requiring a relay to retransmit the command messages. At present, the DFCS, GRDCUS, and MTACS data link waveform (hereinafter referred to as the "DFCS" waveform) can marginally support the 18 aircraft, over the horizon, scenario. In an effort to plan for growth potential, the basic data link waveform of these data links needs to be improved upon. One improvement consists of increasing the data link's data rate without increasing the bandwidth. A second alternative is to increase the data rate by increasing the bandwidth.

The total number of participants, shooters, missiles, and targets that can be tracked and controlled depends on a number of variables. These variables are: ground computer capacity, ground computer I/O speed, message routing, transmitter duty cycle, message length, participant sampling rate, transponder I/O speed, and INSTANTANEOUS BIT RATE of the data link. A method of increasing the data rate without increasing the bandwidth requirement is presented in this specification. This method of increasing the data rate comprises selecting another set of orthogonal chip codes, and allowing them to contain information themselves. Also presented is a method of increasing the data rate by a method of coding the data such that a reduction in duty cycle is realized as well as an increase in the data rate.

Body

Figure 1:
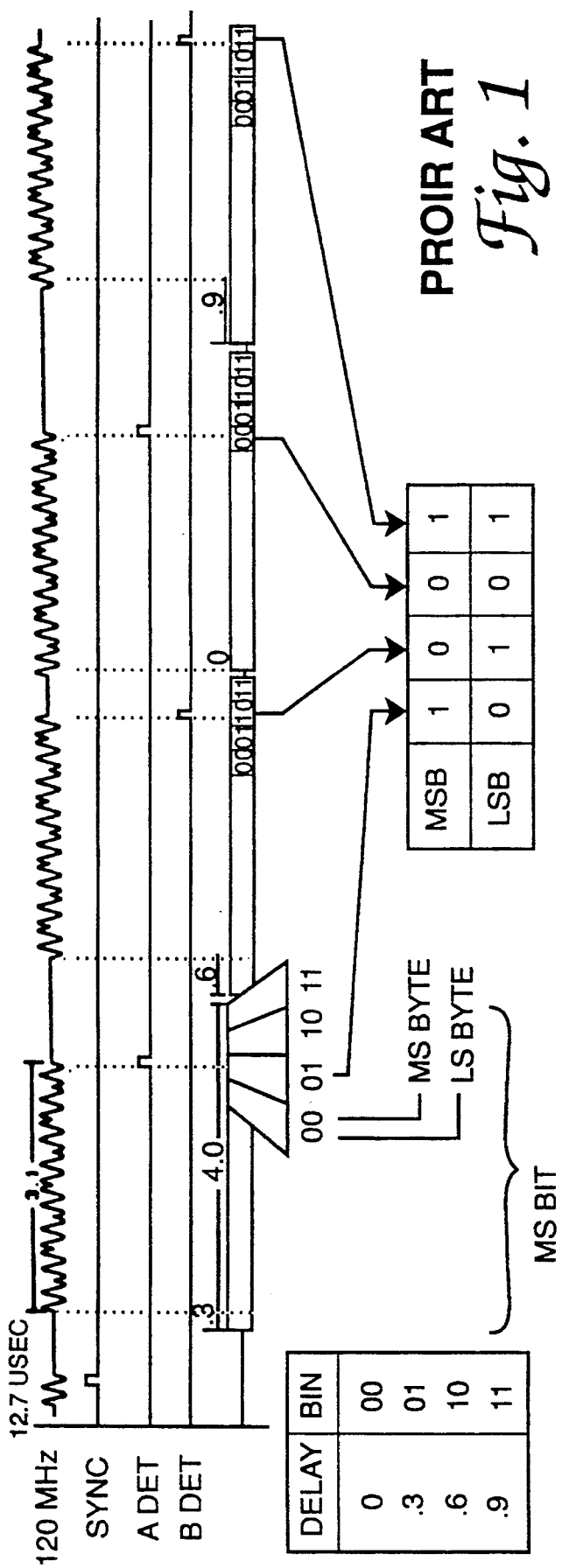
FIG. 1 is a diagram showing the present DFCS waveform with a 10 MHz bandwidth.

The GRDCUS, MTACS, and NGTCS data links are all revisions of the original IBM/DFCS data link. This original data link was developed in the mid 1970s and has been successfully used to control fullscale and subscale target aircraft at White Sands Missile Range (WSMR). The GRDCUS, MTACS, and proposed NGTCS data link use the same waveform as DFCS, but have redefined the message format. The original DFCS data link operates at a carrier frequency of 915 MHz, uses spread spectrum technology, and requires 10 MHz of bandwidth. It has good multipath rejection properties which are attributed to the 10 MHz chip code rate and to the alternating of chip code patterns. See FIG. 1. The GRDCUS data link presently operates at Tyndall AFB, Florida, and routinely controls multiple fullscale and subscale aircraft. At present, the MTACS data link has received authorization to operate on a carrier frequency of 1365 MHz as well as 915 MHz, but still occupies 10 MHz of bandwidth. The MTACS data link is primarily used for tracking vehicles, and sending conventional telemetry to the control facility. All of the above mentioned utilize the data link's distance measuring (DME) feature. This built in feature allows precise vehicle location to be derived from each uplink/downlink sequence. In addition to collecting and deriving TOA/DME measurements, to also has GPS incorporated into it. This feature allows a smooth transition into GPS based systems.

The waveform is synchronized by first having a 127-bit fixed pattern of 1's and 0's (chips) transmitted. These sync chips are transmitted at a 10 MHz rate, thus taking 12.7 microseconds to complete. When all 127 bits of this fixed pattern sync code have been received by the sync correlator SAW, a sync pulse is generated. This sync pulse provides all the timing references for the duration of this transmitted message. The data portion of this waveform is a pulse position encoded waveform, where each data pulse represents two bits of information. Each pulse is encoded as the final chip of a 31-bit fixed chip code sequence. This chip code sequence is clocked at a 10 MHz rate, thus taking 3.1 microseconds to complete. Two different 31-bit data chip codes are utilized. These two chip code patterns are commonly called the "A" chip code pattern, and the "B" chip code pattern. This two code design prevents two adjacent chip code patterns from correlating at the same time due to multipath effects. This method of encoding provides good multipath detection/protection, and follows suit to the precision timing derived from the synchronizing pattern. Each 3.1 microsecond chip code sequence occurs during a 4.0-microsecond window. The two-bit data content is encoded with respect to where the chip code correlated in the 4.0-microsecond window. The sequence needed to encode a data word consists of nine of the data chip code patterns. The two chip code patterns (A and B) alternate, and a 16-bit data word is constructed after nine such chip code patterns. Each 16-bit data word is comprised of 18 bits, the two extra bits being parity for the low byte and high byte. Thus, 36 microseconds is required to transmit each 16 (18 with parity) bit data word. The coding scheme yields a data link bit rate of 500 K bits per second.

As previously stated, this specification discusses the aspect of having two additional 31-bit chip code patterns for the data. These chip code patterns will be named "C" and "D". An assumption is made that the 127-bit sync code is not a superset of the "A", "B", "C" or "D" chip code patterns. Also, there is little or no cross correlation between the four data chip code patterns, but good autocorrelation. Based on these assumptions, each of the four data codes will represent two data bits, as well their position determining two data bits. See FIG. 2. Allow the "A" chip code pattern to represent the two bits 00, the "B" pattern the 01, "C" would represent 10, and "D" would follow to be 11. As an example, let a 31-bit "C" chip code pattern fall in the first position of a 4.0-microsecond data window. Because this chip code pattern correlated in the first position, the data content would be a 0 0, but because this chip code pattern was a "C" pattern, two additional bits (10) are realized.

An improvement to the above scheme is to have eight chip code sequences. These chip codes would allow each of the 4-microsecond windows to have an alternate set of four codes following. This practice would eliminate the chance of sending a "A" code and immediately following it with another "A" code. By having eight codes, the first 4-microsecond window would contain only an "A", "C" or "D" code, and the following 4-microsecond window would contain the "E", "F", "G", or "H" code . The effects of multipath would be reduced further since two codes would not be allowed to repeat immediately.

Either way, this concept of four chip code sequences will double the data rate of the present data link, without requiring an increased bandwidth. As defined, this data link will have a one M bit per second bit rate. With this increased data rate, a faster microprocessor will be required also. The present DFCS type equipment uses the Z-80 microprocessor. This microprocessor is able to acknowledge each data word as it is received at the 6-microsecond rate. But, when the data rate is doubled, even the 3.75 MHz Z-80 will not be able to keep up. Therefore, a faster microprocessor will be needed. Since the vehicle control unit will be outfitted with a GPS receiver, and be required to do more computing, a 68000 or like microprocessor will be needed. At this point, there are only two remaining issues. One issue is to define which of the pulse position bits are to be the most significant and least significant, as well as defining the bits each chip code now carries. The other remaining issue is to determine if existing equipment which only utilized the "A" and "B" chip code patterns can be easily upgraded to this scheme, or if this scheme can be downward compatible.

Figure 3:
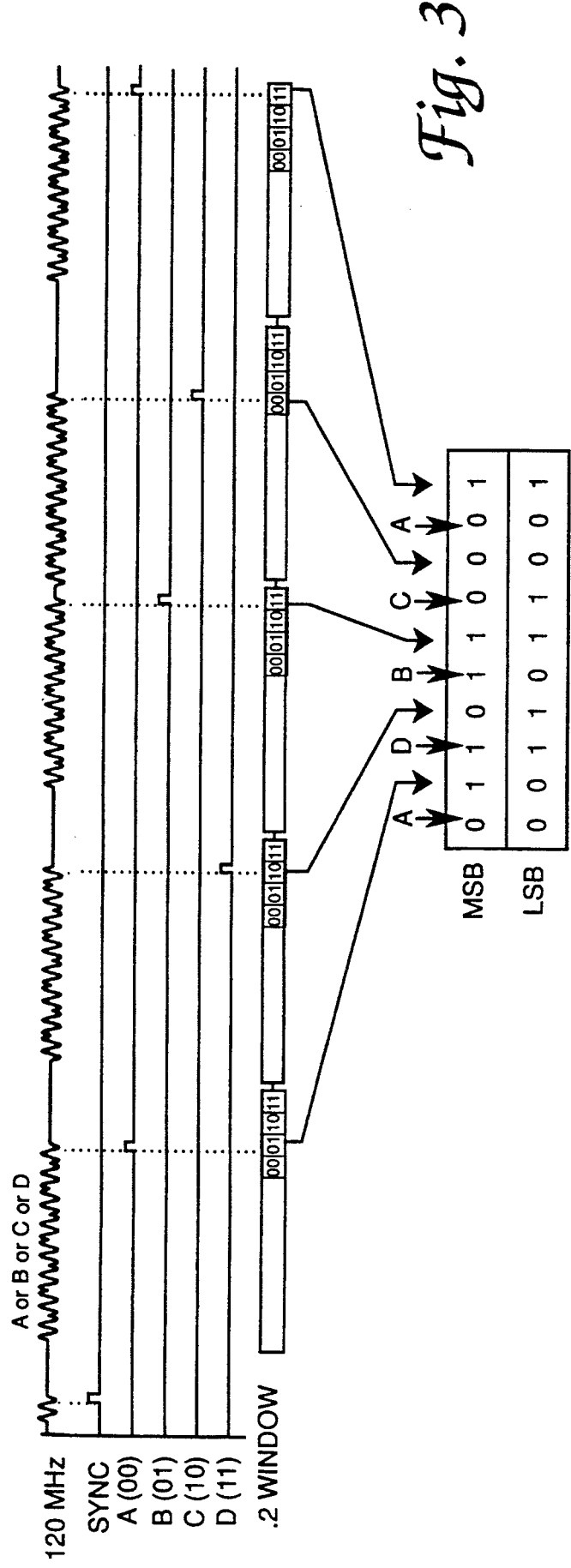
FIG. 3 is a diagram showing a proposed coding scheme for 2M bits/sec data rate with a 20 MHz bandwidth.

In the event the above mentioned scheme does not provide the growth potential needed, then an alterative scheme is available. This scheme utilized the same four-/eight chip code patterns, but doubles the clock rate from 10 MHz to 20MHz. See FIG. 3. This will allow each 4.0-microsecond window to be realized in 2.0 microseconds, thus the amount of time to transmit a single word would take 18 microseconds instead of the present 36 microseconds. By using four chip code patterns, and doubling the clock rate, the overall data rate can be increased by a factor of four, yielding a 2 M bit data link rate. The major concern and drawback to this proposal is obtaining a frequency allocation with 20MHz of bandwidth in a useful portion of the spectrum.

Figure 4:
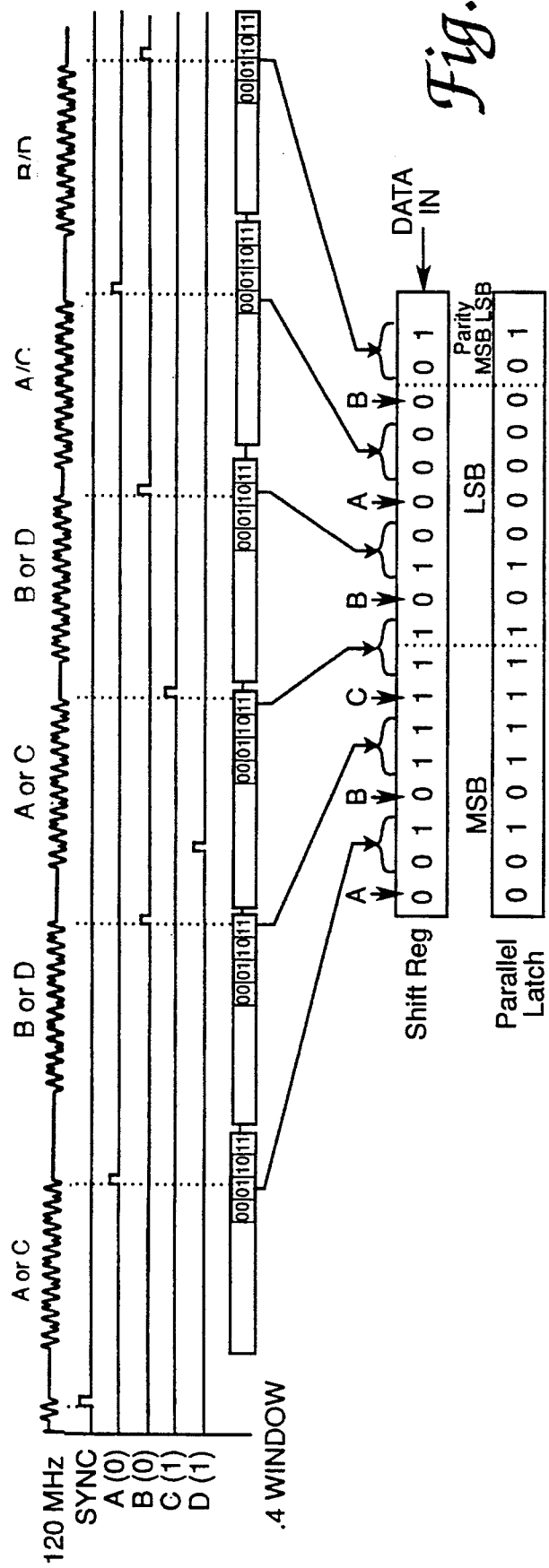
FIG. 4 is a diagram showing a proposed coding scheme for 750 K bits/sec data rate with a 10 MHz bandwidth.

Several other offshoots of these techniques are available also. To achieve a 750 kbit/sec data rate, one of two codes (A or B) may be used to encode the data for the first four-microsecond pulse position. Then, one of two different codes (C or D) may be used to encode the next four-microsecond pulse position. This will yield an alternating chip code sequence, but at the same time yield an additional bit of data. The additional bit of data would be which of two possible codes did indeed actually correlate. See FIG. 4.

Figure 5:
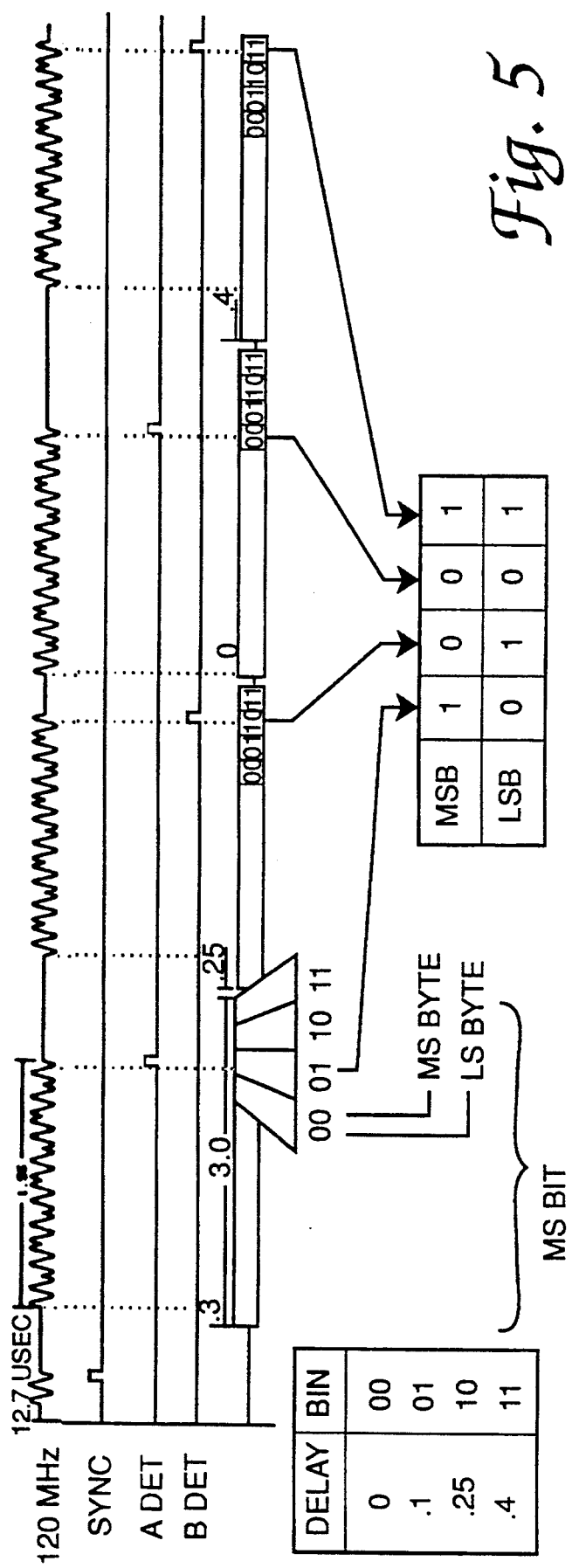
FIG. 5 is a diagram showing a proposed coding scheme for 1M bits/sec data rate with a 20 MHz bandwidth.
Figure 6:
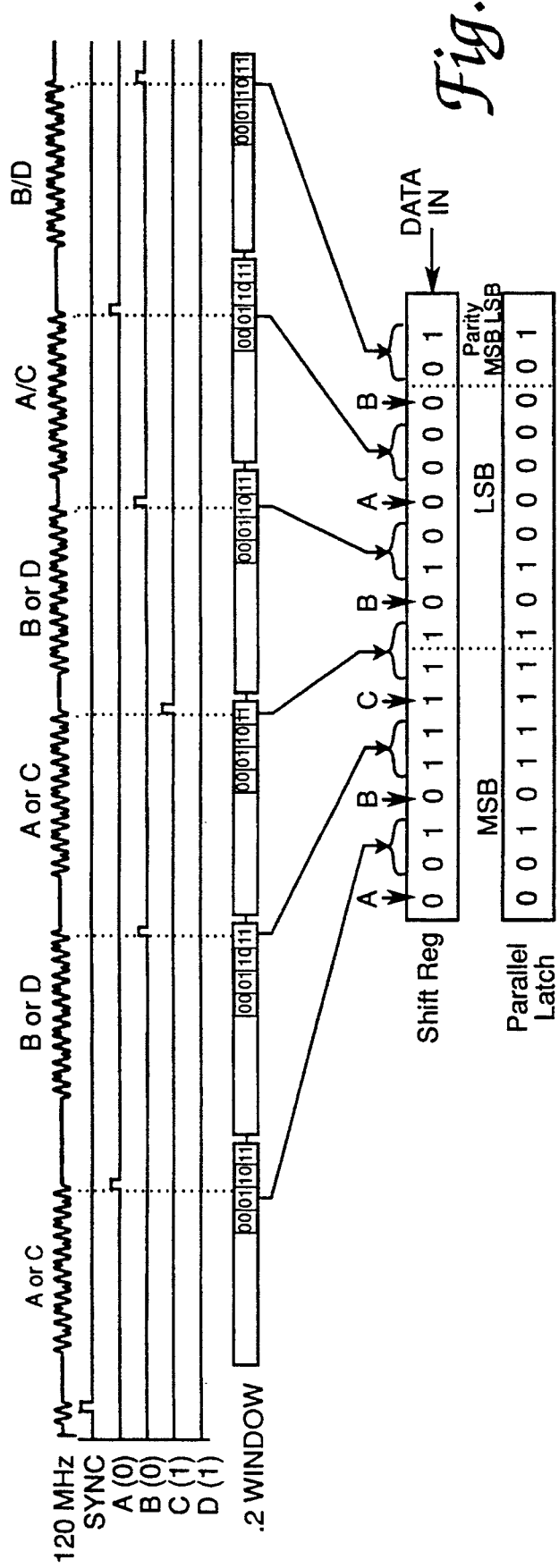
FIG. 6 is a diagram showing a proposed coding scheme for 1.5 M bits/sec data rate with a 20 MHz bandwidth.

Two other coding schemes to increase the data rate are shown in FIGS. 5 and 6. These coding schemes use a 20 MHz chip rate instead of the present 10 MHz rate. A potential hazard of using these coding schemes are the close proximity in time of the correlating pulses. It appears that multipath effects could cause interference.

To reduce the duty cycle (the amount of time RF is being transmitted) of the waveforms, an 8-ary code may be employed. This method suggests that instead of having the correlated pulse fall into one-of-four locations, have it correlate in one-of-eight possible locations (windows). By encoding data in this manner, the RF is transmitted for 3.1 microseconds every 5.2 microseconds, and yields three bits instead of two. Comparing this scheme to the original 3.1 microseconds RF time every 4 microseconds and yielding two bits of data, we realize a duty cycle savings on the order of 25% to 30%.

Figure 2:
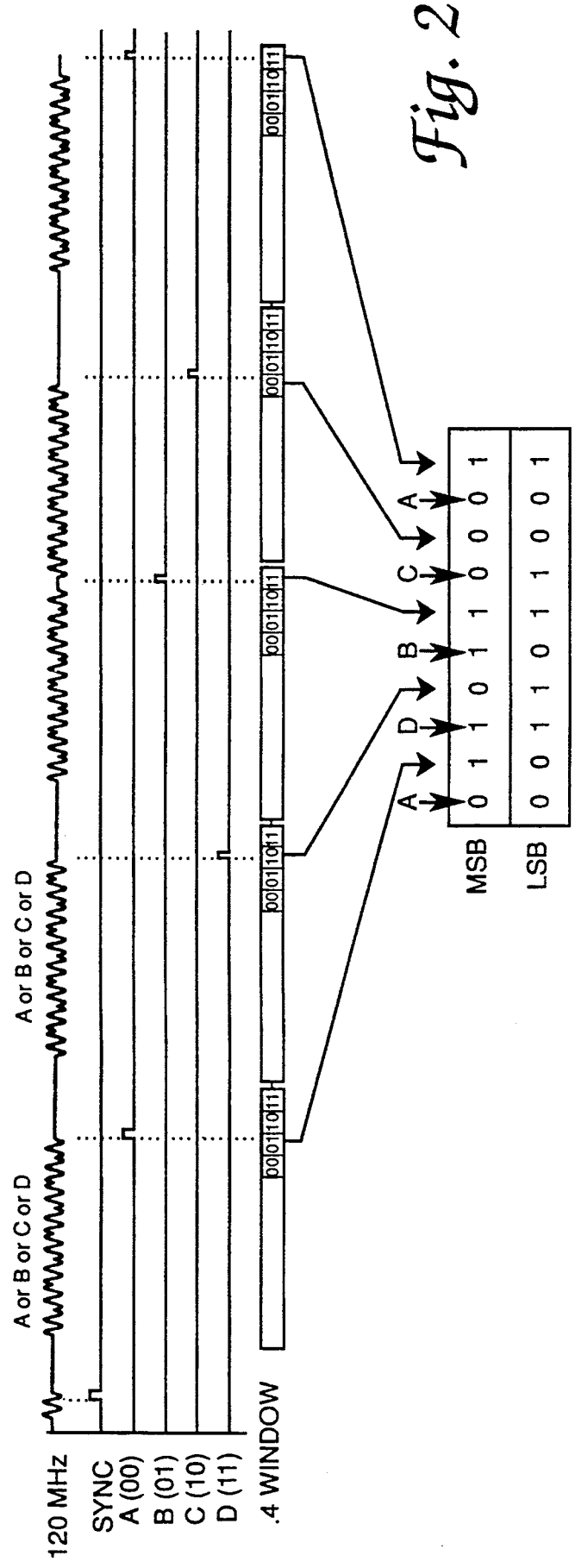
FIG. 2 is a diagram showing a proposed coding scheme for 1 M bits/sec data rate with a 10 MHz bandwidth.

A hybrid approach to the limited data rate and high duty cycle of the DFCS waveform, would be to incorporate the scheme recognized in FIG. 2 as well as converting to a 8-ary code instead of the present 4-ary.

There are several risks associated with these upgrade schemes. See the table below. The chip code sequences must be determined for the additional codes. Then, additional hardware must be built to detect which of the codes correlated, and produce the data bits accordingly. New surface acoustic wave detectors (SAW) must be designed. Performance of the multipath immunity needs investigating once hardware has been developed.

RISKS OF DATA LINK IMPROVEMENTS

680×0 / 80×86 CPU Upgrades

No risk
Hardware and software tools already in place

1 Mbit/sec data rate @ 10 MHz bandwidth

Medium risk
Must generate two new 31-bit chip code sequences
Re-design gate-array transmitter/receiver
Evaluate multipath immunity due to repeating codes
To explore the one M bit data link, digital circuitry to encode and decode the four (or possibly eight) chip code patterns will need to be manufactured. Also a SAW device to detect these codes will need to be manufactured. With minor modifications to a test set and data link unit, the present RF/IF circuitry should be adapted to the new designs. Laboratory and range testing could be conducted at Eglin's ranges to evaluate the effectiveness of the new design.

The bit rate of the existing DFCS waveform can be increased without requiring an increased bandwidth. A method for achieving this increase is to select two additional 31-bit chip code patterns that are orthogonal (not a subset of superset) to the present chip codes, and to each other. This method suggests that each of the four chip code patterns is assigned a two-bit value ie: 00, 01,10, 11. By allowing the chip code placement in the present 4.0-microsecond window to deliver two data bits, and deriving two additional bits from the determination of which chip code sequence correlated, an increased data rate can be realized. If more data thru put is needed, then an additional 10 MHz of bandwidth would be needed. In this additional bandwidth, the chip code clock would be increased from the present 10 MHz to 20 MHz. By doubling the chip code clock, and utilizing four data code patterns, the overall data rate could be increased by a factor of 4.0 (3.6 effective).

The following legends apply to the various figures of the drawings:

FIG. 1

Present DFS Waveform 10 Mhz Bandwidth

500 Kbits/sec data rate (18 bits/18 μsec)
444 K bits useful (16 bits/36 μsec)
Alternate chip code patterns
Phase reversals at 10 Mhz rate . . . 10 Mhz bandwidth
A & B chip code patterns 31 bits long . . . 3.1 μsec per code
Uses a 4 μsec window with four 300 nsec 2-bit bins

FIG. 2

Proposed Coding Scheme For 1 Mbits/sec Data Rate 10 Mhz Bandwidth 1.8 times faster
1.0 Mbits/sec data rate (20 bits/20 μsec)
Does not alternate chip code patterns
Phase reversals at 10 Mhz rate . . . 10 Mhz bandwidth A & B & C & D chip patterns 31 bits long ... 3.1 μsec per code
Uses a 4 μsec window with four 300 nsec 2-bit bins.

FIG. 3

Proposed Coding Scheme For 2 Mbits/sec data rate 20 Mhz Bandwidth 3.6 times faster
2.0 Mbits/sec data rate (20 bits/20 μsec)
1600 Kbits useful (16 bits/10 μsec)
does not alternate chip code patterns
Phase reversals at 20 Mhz rate ... 20 Mhz bandwidth
A & B & C & D chip patterns 31 bits long ... 1.55 μsec per code
Uses a 2 μsec window with four 150 nsec 2-bit bins

FIG. 4

Proposed Coding Scheme For 750 Kbits/sec Data Rate 10 Mhz Bandwidth 1.5 times faster
750 Kbits/sec data rate (18 bits/24 μsec)
666 Kbits useful (16 bits/24 μsec)
Alternate chip code patterns for multipath rejection
Phase reversals at 10 Mhz rate ... 10 Mhz bandwidth
A & B & C & D chip patterns 31 bits long ... 3.1 μsec per code
Uses a 4 μsec window with four 300 nsec 2-sec bins

FIG. 5

Proposed Coding Scheme For 1 Mbits/sec Data Rate 20 Mhz Bandwidth 2 times faster
1.0 Mbits/sec data rate (18 bits/18 μsec)
888 Kbits useful (16 bits/18 μsec)
Alternate chip code patterns
Phase reversals at 20 Mhz rate ... 20 Mhz bandwidth
A & B chip patterns 31 bits long ... 1.55 μsec per code
Uses a 2 μsec window with four 150 nsec 2-bit bins

FIG. 6

Proposed Coding Scheme For 1.5 Mbits/sec Data Rate 20 Mhz Bandwidth 3 times faster
1.5 Mbits/sec data rate (18 bits/12 μsec)
1333 Kbits useful (16 bits/12 μsec)
Alternate chip code patterns
Phase reversals at 20 Mhz rate ... 20 Mhz bandwidth
A & B & C & D chip patterns 31 bits long ... 1.55 μsec per code
Uses a 2 μsec window with four 150 nsec 2-bit bins.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A method of spread spectrum encoding digital data on a data link in which information is transmitted and received at a given rate on a waveform, comprising:
   synchronizing the waveform by first transmitting a synchronizing fixed pattern of a predetermined number of bits of 1's and 0's, and generating a sync pulse when all bits of this fixed pattern sync code have been received by a sync corrector, and the sync pulse provides all timing references for the duration of a message;
   modulating a data portion of the waveform with a pulse position code, where each data pulse represents two bits of information, with each pulse modulated as the final chip of a fixed chip code sequence of a predetermined number of bits, clocked at said given rate, using at least four different data chip codes, designated as A, B, C and D chip code patterns, with each chip code sequence occurring during a window of a predetermined duration, the two-bit data content being modulated with respect to where the chip code correlated in the window, the four data chip code patterns being orthogonal to each other and to the synchronizing fixed pattern; and
   having each of the four data chip codes represent data in addition to the two bits represented by said pulse position.

2. A method of spread spectrum encoding digital data on a data link in which a waveform is transmitted and received at a 10 MHz rate, comprising:
   synchronizing the waveform by first transmitting chips with a 127-bit synchronizing fixed pattern of 1's and 0's, and generating a sync pulse when all 127 bits of this fixed pattern sync code have been received by a sync corrector, which sync pulse provides all timing references for the duration of a message;
   modulating a data portion of the waveform with a pulse position code, where each data pulse represents two bits of information, with each pulse modulated as the final chip of a 31-bit fixed chip code sequence, clocked at a 10 MHz rate, thus taking 3.1 microseconds to complete, using at least four different 31-bit data chip codes, designated as A, B, C and D chip code patterns, with each 3.1 microsecond chip code sequence occurring during a 4.0-microsecond window, the two-bit data content being encoded with respect to where the chip code correlated in the 4.0-microsecond window, the four data chip code patterns being orthogonal to each other and to the synchronizing fixed pattern; and
   having each of the four data chip codes represent data in addition to the two bits represented by said pulse position.

3. A method of spread spectrum encoding digital data according to claim 2, further having each of the four data chip codes represent two bits of data in addition to the two bits represented by said pulse position, so that each chip code pattern represents a total of four bits of data.

4. A method of spread spectrum encoding digital data according to claim 3, further having a total of eight of said data chip code sequences provided, so that in addition to said A, B, C and D chip code patterns, there are four chip code sequences designated as E, F, G and H chip code patterns, using four-microsecond windows for A, B, C and D chip code patterns alternating with four-microsecond windows for E, F, G and H chip code patterns, so that the same data chip code pattern does not occur in successive windows, to thereby reduce effects of multipath propagation.

5. A method of spread spectrum encoding digital data according to claim 2, further having one of two of said data chip code sequences A or B used to modulate the data for the first 4-microsecond pulse position, then having one of two of different ones said data chip code sequences C or D used to modulate the next 4-microsecond pulse position, to thereby yield an alternating chip code sequence, and at the same time which of two possible codes did indeed actually correlate yields an additional bit of data.

* * * * *